Patented May 7, 1940

2,199,767

UNITED STATES PATENT OFFICE 2,199,767

DISPOSAL OF COKE PLANT WASTE LIQUORS

Joseph H. Wells and Philip J. Wilson, Jr., Pittsburgh, Pa., assignors to Carnegie-Illinois Steel Corporation, a corporation of New Jersey No Drawing. Original application October 14, 1935, Serial No. 45,005. Divided and this application May 18, 1938, Serial No. 208,701

2 Claims. (Cl. 210—2)

This application is a division from our copending case of the same title, filed October 14, 1935, and bearing Serial No. 45,005.

The ammonia liquors obtained in the coking of coal contain much organic matter which has proved objectionable when discharged into water courses by reason of the tastes, odors and colors it imparts to the stream. If the liquor is evaporated and these organic compounds are driven into the air with the steam, the odor may prove objectionable. The liquors cannot be discharged into sewage systems, because the sewage, unless treated, eventually makes its way to a stream; and the tastes, odors and colors would be observed. If the sewage containing the waste coke plant liquor is treated by some such bacterial process as the activated sludge or Imhoff tank, compounds in the liquor, such as phenols or thiocyanates, affect the bacteria and the sewage plant efficiency is reduced.

We have found that this objectionable organic matter can be satisfactorily eliminated by giving the coke plant liquor an electrolytic treatment with direct current followed by the action of bacteria, molds, yeasts or other like organisms. The electrolytic action may be prolonged so that the greater portion of the organic matter is destroyed, or it may be relatively short; but in any case it should be of such length that substances harmful to the particular organism or organisms which are being used, such as phenols, thiocyanates, sulphides or thiosulphates, are destroyed. The bacteria, yeasts, or molds complete the elimination of the objectionable organic compounds, and the liquor from this stage should be of such a nature that it could be discharged into a stream. The decision as to the relative extent of the electrolytic or bacterial treatment can best be made to suit local conditions.

Well known arrangements of apparatus may be used for both stages of this process. Thus, continuous electrolytic cells may be employed through which the liquor flows uniformly and from which it is discharged to a regular sewage disposal plant where it is mixed with domestic sewage for the bacterial treatment. Or the electrolyzed liquor can be subjected to the final treatment in suitable vessels of a continuous or intermittent type without admixture with sewage. In other cases some material, such as distillery waste, may be added to the liquor after electrolysis in order to give the bacteria or mold a more balanced diet, and thus favor the growth of an active strain.

Small intermittent electrolytic cells may be used with any of the above arrangements, likewise. The liquor may be treated electrolytically while at atmospheric temperatures or it may be electrolyzed at high temperatures. The closer the liquor is to boiling the smaller the quantity of electrical power for a given degree of purification. If electrolyzed hot, the liquor must first be cooled to a suitable temperature for growth of the organism before it enters the final step of the purification process.

Similarly, in case the electrolytic treatment should render the liquor too acid for favorable growth of the organism, it may be brought to a more desirable pH with lime, soda ash, etc.

A typical operation is as follows: Liquor from the base of the free ammonia still is freed from 90-95 per cent. of the phenol in a vapor recirculation type dephenolizing plant. It then has an organic concentration of 19,000 (the cc. of N/50 $KMnO_4$ required for destroying the organic matter in a liter).

The remaining phenol in large volumes of liquor is still very objectionable. This liquor is electrolyzed in an intermittent cell at 95 degrees centigrade. Anodes of a special lead-silver alloy and iron cathodes are used with a current density of one ampere per square decimeter. By use of 150 kw. hrs. per gallon the organic of the liquor is reduced to 10,000 and the 5 to 10 per cent. phenol left from the dephenolizing plant, the thiocyanate, the thiosulphate, and a portion of the other organic matter are eliminated. The electrolyzed liquor has a pH between 3 and 4; it is neutralized with calcium carbonate, cooled, and pumped into a tank in which it is inoculated with an organism produced by the treatment of a previous batch of liquor. On standing for a month with occasional aeration the organic is reduced to around 1000.

This process also can be applied not only to the ammonia liquor produced directly from gases from the coke ovens, but also to the waste liquor from the ammonia still, or to liquor after a partial treatment in the still, the free still in the example, for instance. In addition, it may be applied to other gas plant liquors, such as tarry waters, or to wastes from other industrial establishments such as oil refineries. In case a tarry liquor, such as a water gas liquor, is treated, it is usually advantageous to remove any undissolved oily, tarry or solid matter prior to electrolysis.

We claim:

1. In the bacterial treatment of waste matter including compounds on which bacteria can grow but also including compounds harmful to bacterial growth, the steps of subjecting said matter to the influence of direct current electricity until at least some of the second named compounds are oxidized, and then subjecting said matter to bacterial action, the effect of said oxidizing influence being regulated during said step to leave a substantial amount of the first named compounds for use by the bacteria.

2. A process for treating ammonia liquor obtained during the operation of by-product coke-ovens, including subjecting said liquor to the influence of direct current electricity until oxidation of substantially all the compounds contained by said liquor of a nature harmful to bacterial growth is effected, and subsequently subjecting said liquor to bacterial action, the effect of said influence being regulated to leave in said liquor a substantial amount of organic compounds on which bacteria can grow.

JOSEPH H. WELLS.
PHILIP J. WILSON, Jr.